3,090,722
STABILIZATION OF ALIPHATIC MERCURY
FUNGICIDES
Harris M. Baker, Glen Farms, Md., assignor to E. I. du
Pont de Nemours and Company, Wilmington, Del., a
corporation of Delaware
No Drawing. Filed Jan. 24, 1961, Ser. No. 84,496
21 Claims. (Cl. 167—42)

This invention relates to fungicidal compositions containing aliphatic mercury compounds and to the stabilization of such compositions.

Fungicidal compositions and seed treatment compositions containing aliphatic mercury compounds and a rhodamine dye are well known in the art. Such compositions are useful, for example, in the treatment of seeds to protect the seeds against soil borne or seed borne organisms. The dye is an essential part of such compositions to mark the treated seed, and thus to prevent inadvertent use of such treated seed for feed purposes.

These compositions are liquids which have the disadvantage of tending towards sludge formation, particularly when prepared and/or stored at comparatively low temperatures. This sludge formation has long been a recognized problem in the trade. Although considerable effort has been expended in an attempt to solve this problem, no satisfactory solution to the problem has been found prior to the present invention.

According to the present invention, undesirable sludge formation in compositions containing an aliphatic mercury compound and rhodamine B base is inhibited by the inclusion therein of a dialkanolamine or a trialkanolamine. For some reason, this narrow class of alkanol amines has been found to reduce or inhibit sludge formation whereas other amines are unsuccessful in inhibiting sludge formation.

The aliphatic mercury compound which is the fungicidally active ingredient in the non-sludging compositions of this invention can be represented by the structure

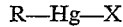

R—Hg—X where R is an aliphatic radical having less than 7 carbon atoms, i.e., 1, 2, 3, 4, 5, or 6 carbon atoms, an X is a negative radical well known as a substituent in organo-mercury fungicidal compounds, such as phosphates, dicyandiamides, 8-hydroxyquinolinates, nitriles, mercaptides, hydroxides, lower alkyl sulfonamides, lower alkyl carboxylic acids, and lower hydroxyalkyl carboxylic acids.

It has been observed that especially advantageous results are achieved when the aliphatic mercury compound is a lower alkyl-mercury salt of a hydroxy-substituted lower-alkyl mercaptan of the formula

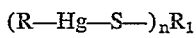

(R—Hg—S—)$_n$R$_1$ where R is methyl, ethyl, n-propyl, isopropyl, n-butyl, isobutyl, or tert-butyl; $n$ is a positive whole integer less than 3, i.e., 1 or 2; and R$_1$ is a hydroxy-substituted loweralkyl or alkylene radical containing from 2 through 6 carbon atoms, and having 1, 2, 3, 4 or 5 OH groups. It will be understood that R$_1$ is monovalent when $n$ is 1 and divalent when $n$ is 2; and also that no more than one OH group or RH$_g$S group is attached to a single carbon atom.

Illustrative of the organomercury compounds within the scope of the compositions of this invention are the following:

Methylmercury acetate
Ethylmercury acetate
Ethylmercury phosphate
Isopropylmercury propionate
Methylmercury butyrate
Isopropylmercury phosphate
Ethylmercury-2,3-dihydroxypropyl mercaptide
Ethylmercury hydroxyacetate
Methylmercury 3-hydroxypropionate
3-hydroxypropylenebis(methylmercury mercaptide)
3-hydroxypropylenebis(ethylmercury mercaptide)
Ethylmercury-N-ethyl-methanesulfonamide
Methylmercury-N-methyl-methanesulfonamide
Methylmercury dicyandiamide
Methylmercury nitrile
n-Butylmercury nitrile
Methylmercury hydroxide
Isobutylmercury hydroxide
Isobutylmercury phosphate
Methylmercury-N-ethyl-ethanesulfonamide
Methylmercury-2,3-dihydroxypropyl mercaptide
Ethylmercury-2,3,4,5,6-pentahydroxyhexyl mercaptide
Methylmercury-8-hydroxyquinolinate
n-Propylmercury nitrile
n-Propylmercury 2-hydroxy-3-chloropentyl mercaptide
Isopropylmercury 2,5-dihydroxypentyl mercaptide
Methylmercury 3,4,5-trihydroxyhexyl mercaptide As stated above, admixture of a rhodamine dye together with the aliphatic mercury salt has been known to be advantageous. However, the problem of sludge formation in these compositions has made their usage less than completely satisfactory. This is particularly true when the composition is prepared, or stored, or both prepared and stored, under low temperature conditions for a long period of time. Thus, when the compositions are exposed for an extended period of time to temperatures on the order of —20° to 5 or 10° C., such as typically happens in winter storage in northern climates, such as a period of weeks or months, the undesirable sludge formation occurs.

According to the present invention, the third essential ingredient in admixture with the aliphatic mercury compound and the rhodamine B base is an alkanolamine from the group including di-ethanolamine, triethanolamine, di-propanolamine, tri-propanolamine, di-butanolamine and tri-butanolamine. Triethanolamine is especially preferred.

Mixtures of these sludge inhibiting alkanolamines can of course be used.

The sludge inhibiting alkanolamine will be used in an amount sufficient to prevent or inhibit sludge formation. The exact amount will depend upon the sludge forming tendency of the other ingredients in the composition, as well as the conditions for preparation and storage for the composition. Generally, an amount of from about 1 to 10% of the sludge inhibiting alkanolamine will be used, but more or less can be used as dictated by circumstances.

Use of the narrow class of alkanolamines to inhibit sludge formation in the compositions of this invention is believed to be the only satisfactory method of sludge inhibition, aside from the only known method heretofore known, namely the use of highly expensive, highly pure, refined starting materials not easily available commercially. Practice of the present invention therefore permits the use of less expensive, commercially available starting materials without cost penalty.

The compositions of this invention, in addition to the three essential ingredients recited above, will usually contain other ingredients such as water, methanol, ethanol, diethyleneglycolmonoethyl ether, diethyleneglycolmonomethyl ether, propanol, isopropanol, ethyleneglycolmonoethyl ether, ethyleneglycolmonomethyl ether, diethyleneglycol, ethyleneglycol, dimethylformamide, glycerol, or other suitable solvents chosen according to the needs of the particular system, as will be readily understood in the art. The compositions can optionally also contain inorganic salts, surfactants, ammonia, sodium hydroxide, as well as other adjuvants, buffers or other organic or inorganic substituents. Some of these ingredients are present when normal commercially available starting materials, over which little control can be exercised, are used, while some of the others might be added to inhibit corrosion, to aid in extending the treatment over the surface of the seed, or the like.

The solvents chosen for use in the compositions will generally be those which will lend to the composition the property of having a flash point greater than 80° F.

Normally, the compositions of this invention will contain by weight from about 1% to about 15% of the aliphatic mercury compound, from about 0.2% to about 6% of rhodamine B base, and from about 1 to 10% of the alkanolamine, the balance of the composition comprising solvent, inorganic salts, impurities, and the like, as mentioned above.

The various components of the composition can be admixed in any order as convenient. Ordinarily, the alkanolamine will be incorporated in the composition before the aliphatic mercury compound and rhodamine B base, but this is not essential.

The following examples are illustrative of the present invention. The percent figures indicated are by weight.

*Example 1*

The following composition is formed by liquid blending of the components:

| | Percent |
|---|---|
| Ethylmercury acetate | 1.3 |
| Ethylmercury-2,3-dihydroxypropyl mercaptide | 6.0 |
| Ethanol | 12.0 |
| Ethyleneglycol | 40.0 |
| Sodium nitrite | 1.5 |
| Rhodamine B base | 2.0 |
| Triethanolamine | 5.0 |

The balance of the composition is water and unidentified impurities normally associated with commercially available starting materials used in the preparation of the composition.

This composition upon storage at room temperature, or at controlled 5° C. temperature, or even as low as −25° C., for a period of several months, evidences no sediment or sludge formation.

By comparison, an identical formulation prepared in an identical manner except that the 5% triethanolamine is replaced with water, shows a highly objectionable sludge formation developing within two to three weeks after storage at 5° C. and −25° C.

*Example 2*

The compound ethylmercury-N-ethyl-methanesulfonamide is formulated by simple blending of the indicated ingredients into a fungicidal composition of the following ingredients:

| | Percent |
|---|---|
| Ethylmercury-N-ethyl-methanesulfonamide | 2.5 |
| Rhodamine B base | 1.5 |
| Methanol | 15.0 |
| Ethylene glycolmonoethyl ether | 35.0 |
| Diethanolamine | 4.0 |
| Water plus impurities | 42.0 |

This fungicidal composition is free of sludge when prepared and no significant amount of sludge forms when the material is stored at low temperatures for an extended period of time.

*Example 3*

The compound methylmercury dicyandiamide is formulated into a fungicidal composition of the following ingredients:

| | Percent |
|---|---|
| Methylmercury dicyandiamide | 8.0 |
| Rhodamine B base | 6.0 |
| Diisopropanolamine | 10.0 |
| Diethylene glycol | 66.0 |
| Glycerol | 10.0 |

When this formulation is stored at low temperatures, no significant amount of sludge forms.

*Example 4*

The compound n-butylmercury nitrile is formulated into a fungicidal composition containing the following ingredients:

| | Percent |
|---|---|
| n-Butylmercury nitrile | 1.0 |
| Rhodamine B base | .2 |
| Tri-n-butanolamine | 1.0 |
| Dimethylformamide | 77.8 |
| Water plus impurities | 20.0 |

When this composition is prepared no significant amount of sludge forms and no sludge forms when the composition is stored at low temperatures for an extended period of time.

*Example 5*

Isobutylmercury hydroxide is formulated into a pesticidal composition containing the following ingredients:

| | Percent |
|---|---|
| Isobutylmercury hydroxide | 5.0 |
| Rhodamine B base | 3.0 |
| Isopropanol | 20.0 |
| Diethylene glycol | 40.0 |
| Triisopropanolamine | 5.0 |
| Water plus impurities | 27.0 |

No significant amount of sludge forms when this composition is prepared and stored at low temperature.

*Example 6*

The compounds methylmercury monothioglycol and methylmercury acetate are formulated into a fungicidal composition as follows:

| | Percent |
|---|---|
| Methylmercury acetate | 1.0 |
| Methylmercury monothioglycol | 5.0 |
| Rhodamine B base | 2.5 |
| Ethyleneglycolmonomethyl ether | 15.0 |
| Methanol | 10.0 |
| Ethylene glycol | 30.0 |
| Di-n-butanolamine | 3.0 |
| Water plus impurities | 33.5 |

No significant amount of sludge forms when this composition is prepared and when it is stored at low temperatures.

Example 7

The compound isopropylmercury phosphate is formulated into a fungicidal composition as follows:

| | Percent |
|---|---|
| Isopropylmercury phosphate | 10.0 |
| Rhodamine B base | 4.0 |
| Di secondary butanolamine | 8.0 |
| Diethyleneglycolmonomethyl ether | 60.0 |
| Ethanol | 12.0 |
| Water plus impurities | 6.0 |

When this composition is prepared and stored at low temperatures, no significant amount of sludge forms.

Example 8

Methylmercury-N-methyl-methanesulfonamide is formulated into a fungcidal composition as follows:

| | Percent |
|---|---|
| Methylmercury-N-methyl-methanesulfonamide | 15.0 |
| Rhodamine B base | 6.0 |
| Dimethylformamide | 74.0 |
| Diethanolamine | 5.0 |

When this formulation is prepared and stored at low temperatures, no significant amount of sludge develops.

Example 9

Methylmercury - 2,3 - dihydroxypropyl mercaptide is formulated into a fungicidal composition containing the following ingredients:

| | Percent |
|---|---|
| Methylmercury-2,3-dihydroxypropyl mercaptide | 4.0 |
| Rhodamine B base | 1.0 |
| Propanol | 10.0 |
| Ethyleneglycol | 40.0 |
| Diethanolamine | 4.0 |
| Water plus impurities | 41.0 |

When this composition is prepared, no appreciable amount of sludge forms and no appreciable amount of sludge forms when the composition is stored at low temperatures.

Example 10

The compound methylmercury-8-hydroxyquinolinate is formulated into a fungicidal composition containing the following ingredients:

| | Percent |
|---|---|
| Methylmercury-8-hydroxyquinolinate | 2.0 |
| Rhodamine B base | 1.0 |
| Diethyleneglycolmonoethyl ether | 50.0 |
| Isopropyl alcohol | 10.0 |
| Triisopropanolamine | 6.0 |
| Water plus impurities | 31.0 |

No significant amount of sludge forms when this composition is prepared or when it is stored at low temperatures.

Example 11

The compound ethylmercury-N-methylmethanesulfonamide is formulated as in Example 5. No significant amount of sludge forms when this formulation is prepared or when it is stored at low temperatures.

Example 12

The compound methylmercury nitrile is formulated as in Example 8. No significant amount of sludge forms when this composition is prepared or when it is stored at low temperatures.

The invention claimed is:

1. A fungicidal composition comprising as essential ingredients 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and a sludge inhibiting amount of at least one compound selected from the group consisting of (1) di-alkanolamines wherein the alkanol has from 2 to 4 carbon atoms inclusive and (2) tri-alkanolamines wherein the alkanol has from 2 to 4 carbon atoms inclusive.

2. A fungicidal composition comprising as essential ingredients 1% to 15% by weight of a fungicidal aliphatic mercury compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptrans, hydroxides, lower alkyl sulfonamides, lower alkyl carboxylic acid and lower hydroxyalkyl carboxylic acids, said composition additionally containing from about 0.2% to 6% by weight of rhodamine B base and from about 1% to 10% by weight of a compound selected from the group consisting of (1) dialkanolamines wherein the alkanol has from 2 to 4 carbon atoms inclusive and (2) tri-alkanolamines wherein the alkanol has from 2 to 4 carbon atoms inclusive.

3. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to 10% by weight of diethanolamine.

4. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to about 10% by weight of triethanolamine.

5. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to 10% by weight of di-iso-propanolamine.

6. A fungicidal composition comprising as essential ingredients from about 1% to 15% by weight of a compound of the formula:

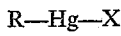

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to 10% by weight of tri-iso-propanolamine.

7. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to 10% by weight of di-n-butanolamine.

8. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids, said composition additionally containing from about 0.2% to 6% by weight of rhodamine B base and from about 1% to 10% by weight of tri-n-butanolamine.

9. A fungicidal composition comprising as essential ingredients from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids said composition additionally containing from about 0.2% to 6% by weight of rhodamine B base and from about 1% to 10% by weight of di-sec-butanolamine.

10. A fungicidal composition comprising from about 1% to 15% by weight of methylmercury 2,3-dihydroxypropyl mercaptide, from about 0.2% to 6% by weight of rhodamine B base and from about 1% to 10% by weight of tri-ethanolamine.

11. A fungicidal composition comprising from 1% to 15% by weight of ethylmercury 2,3-dihydroxypropyl mercaptide, from about 0.2% to 6% by weight of rhodamine B base and from about 1% to 10% by weight of tri-ethanolamine.

12. A fungicidal composition comprising from about 1% to 15% by weight of methylmercury 2,3-dihydroxypropyl mercaptide, from about 0.2% to 6% by weight of rhodamine B base and from about 1% to 10% by weight of di-iso-propanolamine.

13. A fungicidal composition comprising from about 1% to 15% by weight of ethylmercury 2,3-dihydroxypropyl mercaptide, from about 0.2% to 6% by weight of rhodamine B base and from about 1% to 10% by weight of di-iso-propanolamine.

14. A method of inhibiting sludge formation in a fungicidal composition containing 1% to 15% by weight of a compound of the formula:

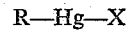

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids, and lower hydroxyalkyl carboxylic acids; and 0.2% to 6% by weight of rhodamine B base, comprising incorporating therein a sludge inhibiting amount of at least one compound selected from the group consisting of (1) di-alkanolamines wherein the alkanol has from 2 to 4 carbon atoms inclusive and (2) tri-alkanolamines wherein the alkanol has from 2 to 4 carbon atoms inclusive.

15. A method of inhibiting sludge formation in a fungicidal composition containing from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of rhodamine B base, comprising incorporating therein from about 1% to 10% by weight of di-ethanolamine.

16. A method of inhibiting sludge formation in a fungicidal composition containing from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of a rhodamine B base, comprising incorporating therein from about 1% to 10% by weight of tri-ethanolamine.

17. A method of inhibiting sludge formation in a fungicidal composition containing from about 1% to 15% by weight of a compound of the formula:

R—Hg—X wherein
R is an aliphatic radical of 1 through 6 carbons atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of rhodamine B base, comprising incorporating therein from about 1% to 10% by weight of di-iso-propanolamine.

18. A method of inhibiting sludge formation in a fugicidal composition containing from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of rhodamine B base comprising incorporating therein from about 1% to 10% by weight of tri-iso-propanolamine.

19. A method of inhibiting sludge formation in a fungicidal composition containing from about 1% to 15% by weight of a compound of the formula:

R—Hg—X wherein
R is an aliphatic radical of 1 through 6 carbons atoms and
X is selected from the group consisting of phosphates, dicyandiamides, 8-hydroxyquinolinates, nitriles, mercaptides, hydroxy-substituted lower alkyl and alkylene mercaptans, hydroxides, lower sulfonamides, lower alkyl carboxylic acids, and lower hydroxyalkyl carboxylic acids; and from about 0.2% to 6% by weight of rhodamine B base, comprising incorporating therein from about 1% to 10% by weight of di-n-butanolamine.

20. A method of inhibiting sludge formation in a fungicidal composition containing from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of rhodamine B base, comprising incorporating therein 1% to 6% by weight of tri-n-butanolamine.

21. A method of inhibiting sludge formation in a fungicidal composition containing from about 1% to 15% by weight of a compound of the formula:

R—Hg—X wherein
R is an aliphatic radical of 1 through 6 carbon atoms and
X is selected from the group consisting of phosphates, dicyandiamides, 8-hydroxyquinolinates, nitriles, mercaptides, hydroxy-substituted lower alkyl and alkylene mercaptans, hydroxides, lower alkyl sulfonamides, lower alkyl carboxylic acids and lower hydroxyalkyl carboxylic acids; and from about 0.2% to 6% by weight of rhodamine B base, comprising incorporating therein 1% to 6% by weight of di-sec-butanolamine.

References Cited in the file of this patent

UNITED STATES PATENTS

| | | |
|---|---|---|
| 1,618,370 | Engelmann | Feb. 22, 1927 |
| 1,688,720 | Klages | Oct. 23, 1928 |
| 2,422,951 | Conant | June 24, 1947 |
| 2,958,625 | Rebold | Nov. 1, 1960 |